US012623626B2

(12) United States Patent
Heo

(10) Patent No.: US 12,623,626 B2
(45) Date of Patent: May 12, 2026

(54) KNEE AIRBAG APPARATUS

(71) Applicant: HYUNDAI MOBIS CO., LTD., Seoul (KR)

(72) Inventor: Jeong Mo Heo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/969,005

(22) Filed: Dec. 4, 2024

(65) Prior Publication Data

US 2025/0333019 A1 Oct. 30, 2025

(30) Foreign Application Priority Data

Apr. 29, 2024 (KR) ........................ 10-2024-0056881

(51) Int. Cl.
| | |
|---|---|
| *B60R 21/06* | (2006.01) |
| *B60R 21/201* | (2011.01) |
| *B60R 21/206* | (2011.01) |
| *B60R 21/215* | (2011.01) |
| *B60R 21/217* | (2011.01) |
| *B60R 21/2338* | (2011.01) |

(Continued)

(52) U.S. Cl.
CPC ........ *B60R 21/2338* (2013.01); *B60R 21/201* (2013.01); *B60R 21/206* (2013.01); *B60R 21/215* (2013.01); *B60R 21/2171* (2013.01); *B60R 21/237* (2013.01); *B60R 21/261* (2013.01); *B60R 2021/161* (2013.01); *B60R 2021/23169* (2013.01); *B60R 2021/23382* (2013.01); *B60R 2021/23386* (2013.01); *B60R 2021/23538* (2013.01); *B60R 2021/23576* (2013.01)

(58) Field of Classification Search
CPC B60R 2021/23169; B60R 2021/23382; B60R 2021/23386; B60R 2021/0051; B60R 2021/0053; B60R 2021/161; B60R 2021/23576; B60R 2021/23176; B60R 2021/23538; B60R 2021/01238; B60R 2021/23571; B60R 21/206; B60R 21/205; B60R 21/237; B60R 21/215; B60R 21/261; B60R 21/2338; B60R 21/231; B60R 21/2334; B60R 21/2171; B60R 21/201; B60R 21/26; B60R 21/2342; B60R 21/2176
USPC ...... 280/728.1, 728.2, 730.1, 732, 736, 740, 280/742, 743.1, 743.2
See application file for complete search history.

(56) References Cited

U.S. PATENT DOCUMENTS

| | | | |
|---|---|---|---|
| 10,974,684 B2 * | 4/2021 | Enders | B60R 21/2338 |
| 10,994,691 B2 * | 5/2021 | Wasilewska | B60R 21/231 |

(Continued)

FOREIGN PATENT DOCUMENTS

| | | | |
|---|---|---|---|
| CN | 201525347 U | * | 7/2010 |
| CN | 214240721 U | * | 9/2021 |

(Continued)

*Primary Examiner* — Keith J Frisby
(74) *Attorney, Agent, or Firm* — NSIP Law

(57) ABSTRACT

A knee airbag apparatus including an airbag cushion including a lower sheet portion, an upper sheet portion to overlap the lower sheet portion to form a cushion space together with the lower sheet portion, and a folded portion formed by folding the upper sheet portion so that portions of the upper sheet portion overlap partially, and an inflator to supply a gas to the cushion space so that the airbag cushion is deployed.

12 Claims, 7 Drawing Sheets

(51) Int. Cl.
| | |
|---|---|
| *B60R 21/237* | (2006.01) |
| *B60R 21/261* | (2011.01) |
| *B60R 21/16* | (2006.01) |
| *B60R 21/231* | (2011.01) |
| *B60R 21/235* | (2006.01) |

(56) References Cited

U.S. PATENT DOCUMENTS

| | | | | |
|---|---|---|---|---|
| 2005/0151351 A1* | 7/2005 | Enders | B60R 21/235 | 280/730.1 |
| 2006/0071459 A1* | 4/2006 | Hayakawa | B60R 21/206 | 280/730.1 |
| 2007/0246920 A1* | 10/2007 | Abele | B60R 21/206 | 280/743.2 |
| 2007/0267852 A1* | 11/2007 | Enders | B60R 21/01516 | 280/730.1 |
| 2010/0117343 A1* | 5/2010 | Hoffman | B60R 21/231 | 280/730.2 |
| 2011/0095512 A1* | 4/2011 | Mendez | B60R 21/206 | 280/730.1 |
| 2011/0109070 A1* | 5/2011 | Tanaka | B60R 21/233 | 280/741 |
| 2011/0260434 A1* | 10/2011 | Gottschalk | B60R 21/206 | 280/730.2 |
| 2012/0007345 A1* | 1/2012 | Lee | B60R 21/2176 | 280/728.2 |
| 2012/0205898 A1* | 8/2012 | Picard | B60R 21/2338 | 280/730.1 |
| 2013/0093168 A1* | 4/2013 | Przybysz | B60R 21/235 | 280/729 |
| 2015/0197210 A1* | 7/2015 | Abe | B60R 21/206 | 280/729 |
| 2016/0288758 A1* | 10/2016 | Ando | B60R 21/206 | |
| 2017/0057447 A1* | 3/2017 | Ando | B60R 21/233 | |
| 2017/0232920 A1* | 8/2017 | Abe | B60R 21/233 | 280/729 |
| 2018/0244234 A1* | 8/2018 | Anae | B60R 21/2338 | |
| 2019/0039555 A1* | 2/2019 | Elija | B60R 21/233 | |
| 2022/0289133 A1* | 9/2022 | Walker | B60R 21/2334 | |

FOREIGN PATENT DOCUMENTS

| | | | | | |
|---|---|---|---|---|---|
| DE | 102014010188 A1 | * | 1/2016 | ......... | B60R 21/206 |
| DE | 102016121608 A1 | * | 6/2017 | | |
| JP | 6507797 B2 | * | 5/2019 | ......... | B60R 21/206 |
| KR | 10-2016-0129232 A | | 11/2016 | | |
| KR | 20200000127 A | * | 1/2020 | | |
| KR | 20220043551 A | * | 4/2022 | | |
| WO | WO-2009029203 A1 | * | 3/2009 | ......... | B60R 21/206 |
| WO | WO-2016027543 A1 | * | 2/2016 | ......... | B60R 21/206 |

* cited by examiner

WIDTH
DIRECTION

LONGITUDINAL
DIRECTION

KNEE AIRBAG APPARATUS

CROSS-REFERENCE TO RELATED APPLICATION

This application claims priority from and the benefit under 35 USC § 119 of Korean Patent Application No. 10-2024-0056881, filed on Apr. 29, 2024, in the Korean Intellectual Property Office, the entire disclosure of which is incorporated by reference for all purposes.

BACKGROUND

FIELD

Exemplary embodiments of the present disclosure relate to a knee airbag apparatus, and more particularly, to a knee airbag apparatus configured to be deployed in an upward direction along an instrument panel.

DESCRIPTION OF THE RELATED ART

A knee airbag apparatus refers to an airbag apparatus in which an airbag cushion is deployed between an instrument panel and a passenger's knee to protect the passenger's knee. The knee airbag apparatus is installed in the instrument panel. In the event of a collision accident of a vehicle, the inside of the airbag cushion is filled with gas generated by an inflator, such that the airbag cushion may be deployed in an upward direction from a lower end of the instrument panel toward the passenger.

The airbag cushion of the knee airbag apparatus needs to be deployed in the upward direction against gravity. However, in case that several additional components are added to implement the upward deployment, manufacturing costs may be increased, and assembling productivity may be degraded. In addition, because the weight of the knee airbag apparatus may be increased, an effect of improving an upward deployment force may not meet expectations.

The background technology of the present disclosure is disclosed in Korean Patent Application Laid-Open No. 10-2016-0129232 (published on Nov. 9, 2016, and entitled 'Knee Airbag for Vehicle').

SUMMARY

Various embodiments are directed to a knee airbag apparatus capable of improving an upward deployment force of an airbag cushion so that the airbag cushion is deployed in the upward direction along an instrument panel when the airbag cushion is deployed.

A knee airbag apparatus according to the present disclosure includes: an airbag cushion including a lower sheet portion, an upper sheet portion configured to overlap the lower sheet portion to form a cushion space together with the lower sheet portion, and a folded portion formed by folding the upper sheet portion so that portions of the upper sheet portion overlap partially; and an inflator configured to supply a gas to the cushion space so that the airbag cushion is deployed.

The airbag cushion may include a first end, and a second end opposite to the first end in a longitudinal direction, the inflator may be positioned in the cushion space closer to the first end than the second end of the airbag cushion, and the folded portion may be positioned closer to the first end than the second end of the airbag cushion.

The knee airbag apparatus may further include: a heat-resistant layer stacked on an inner surface of the first end of the airbag cushion.

The knee airbag apparatus may further include: a mouth tether positioned in the cushion space closer to the first end than the second end of the airbag cushion and including a first end coupled to the folded portion, and a second end coupled to the lower sheet portion.

The mouth tether may include: a first mouth tether; and a second mouth tether including the first end coupled to the folded portion together with the first end of the first mouth tether, and the second end coupled to the lower sheet portion at a position different from a position at which the second end of the first mouth tether is coupled to the lower sheet portion, and the second end of the first mouth tether may be positioned closer to the first end of the airbag cushion than the second end of the second mouth tether.

A length from the first end to the second end of the second mouth tether may be shorter than a length from the first end to the second end of the first mouth tether.

A thickness of the first mouth tether may be larger than a thickness of the second mouth tether.

The first end of the first mouth tether and the first end of the second mouth tether may be fitted into the folded portion and sewed and coupled together with the folded portion.

The knee airbag apparatus may further include: an airbag housing defining an internal space in which the airbag cushion is accommodated in a folded state; and a hook tether including a first end coupled to the folded portion, and a second end configured to penetrate the airbag housing and connected to the airbag housing.

The airbag housing may include: a base connected to the hook tether; and a cover coupled to the base and configured to separate from the base when the airbag cushion is deployed.

The knee airbag apparatus may further include: a cushion cover configured to block the deployment of the airbag cushion so that the airbag cushion is kept folded when a gas is not supplied to the cushion space by the inflator.

The knee airbag apparatus may further include: an airbag housing defining an internal space in which the airbag cushion is accommodated in a folded state, in which the cushion cover includes a first end coupled to an outer surface of the airbag cushion, and a second end coupled to the airbag housing, and in which the cushion cover is disconnected or the second end of the cushion cover is separated from the airbag housing when the airbag cushion is deployed.

The knee airbag apparatus may further include: a cushion flap including a first end coupled to the folded portion, and a second end that is a free end.

The knee airbag apparatus may further include an airbag housing defining an internal space in which the airbag cushion is accommodated in a folded state, in which the cushion flap may be deployed so that the airbag cushion does not enter a gap between the airbag housing and an instrument panel or is not caught by the instrument panel when the airbag cushion is deployed.

The knee airbag apparatus may further include: a diffuser configured to surround the inflator and diffuse a gas discharged from a gas discharge port of the inflator.

The airbag cushion may be formed by sewing one cut panel.

The knee airbag apparatus may further include: a center tether positioned between the second end of the airbag cushion and the mouth tether in the cushion space and having a first end coupled to the upper sheet portion, and a second end coupled to the lower sheet portion.

According to the present disclosure, the length of the upper sheet portion is shorter than the length of the lower sheet portion by the folded portion, which may improve the upward deployment force of the airbag cushion.

According to the present disclosure, the second mouth tether, which has the length shorter than the length of the first mouth tether, pulls the lower sheet portion upward, which may further improve the upward deployment force of the airbag cushion.

DETAILED DESCRIPTION

Hereinafter, a knee airbag apparatus will be described in detail below with reference to the accompanying drawings through various exemplary embodiments. The terminologies used in the present specification are used to appropriately express an exemplary embodiment of the present disclosure and may vary depending on the intention of a user or operator or on usual practice in the art to which the present disclosure pertains. Therefore, the definition of the terms should be made on the basis of the entire contents of the present specification.

Figure 1:
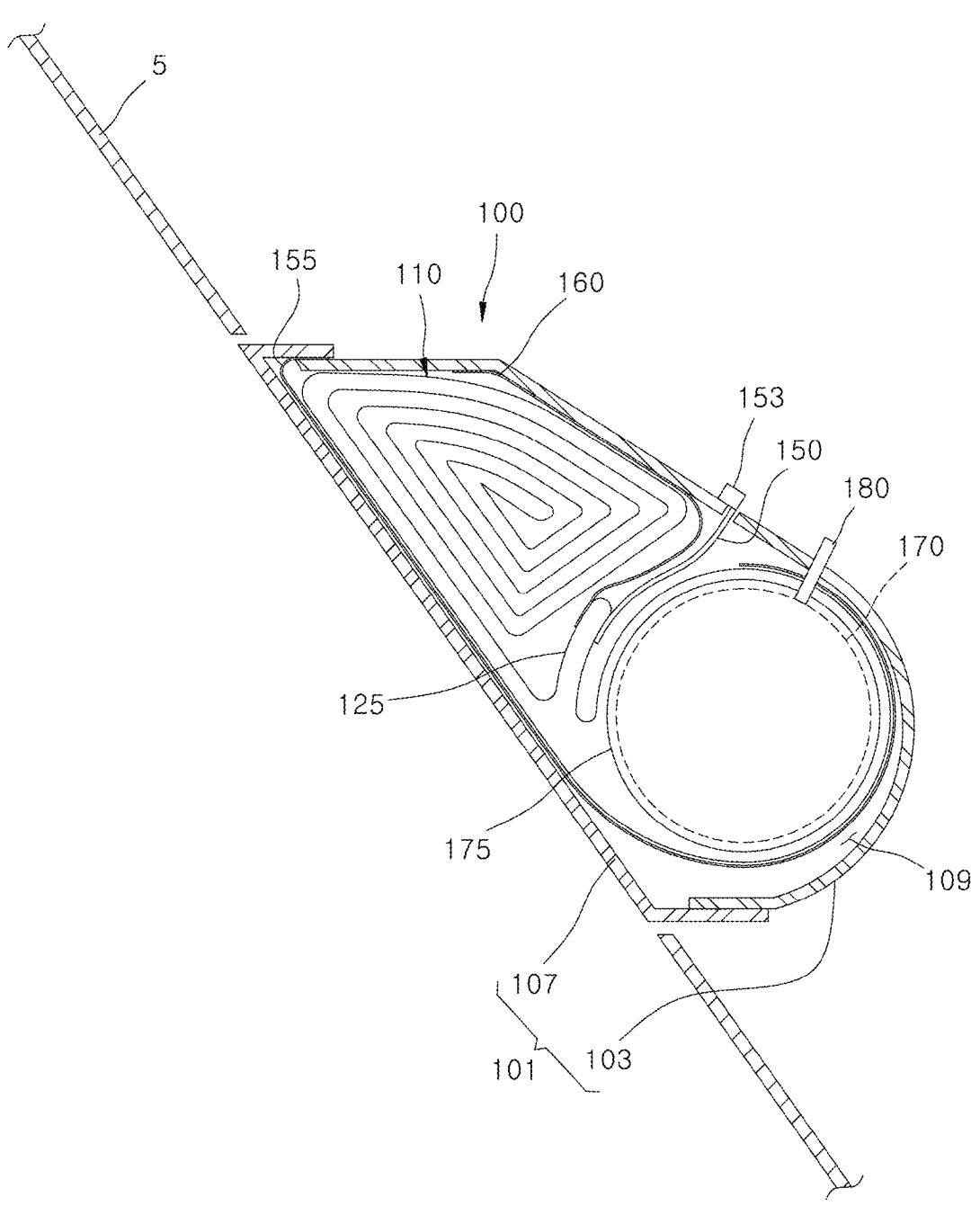
FIG. 1 is a cross-sectional view illustrating a state in which a knee airbag apparatus according to an embodiment of the present disclosure is accommodated in an airbag housing.
Figure 2:
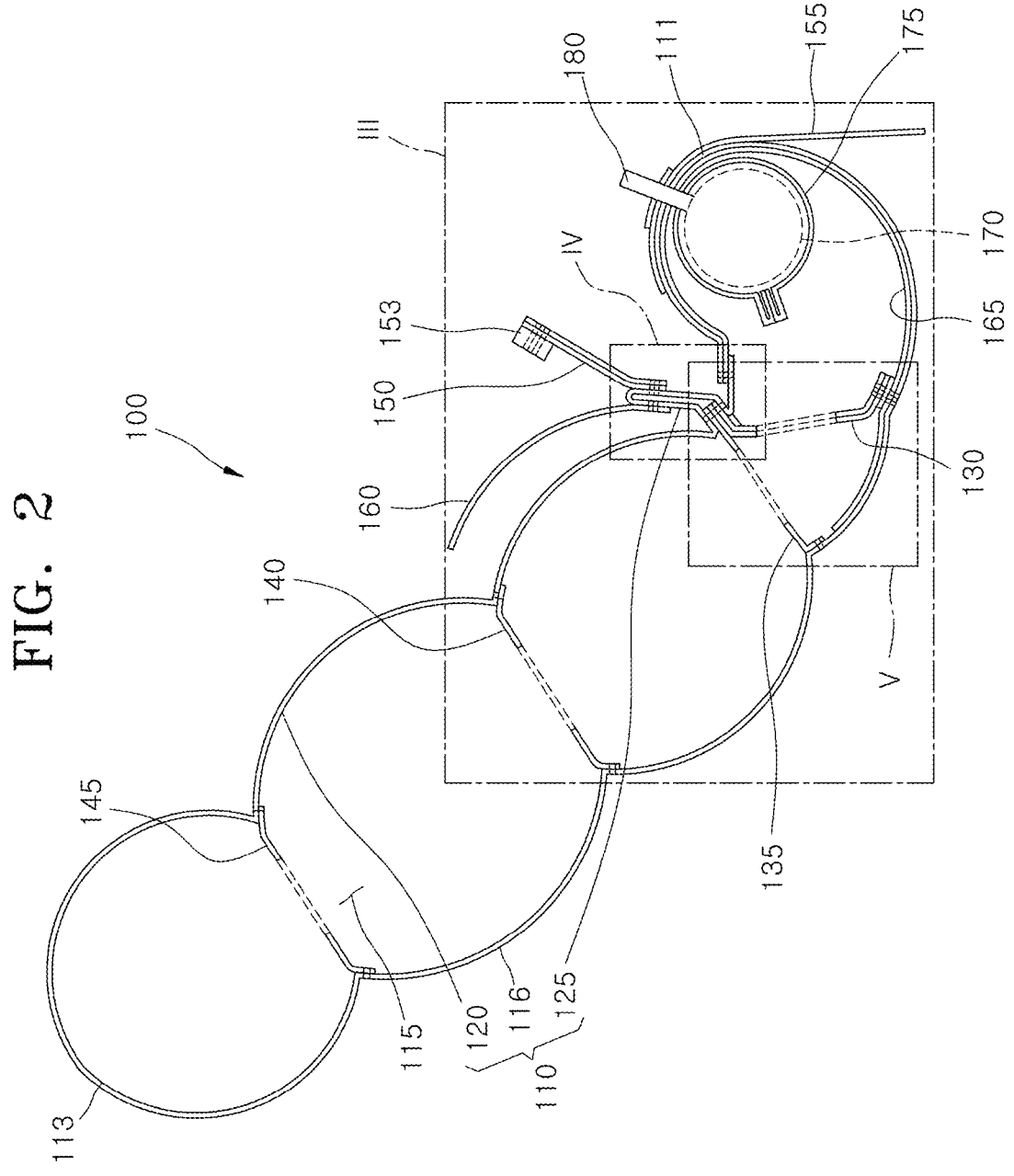
FIG. 2 is a cross-sectional view illustrating a state in which the knee airbag apparatus according to the embodiment of the present disclosure is deployed, i.e., a view illustrating a state in which an instrument panel and an airbag housing are removed.
Figure 3:
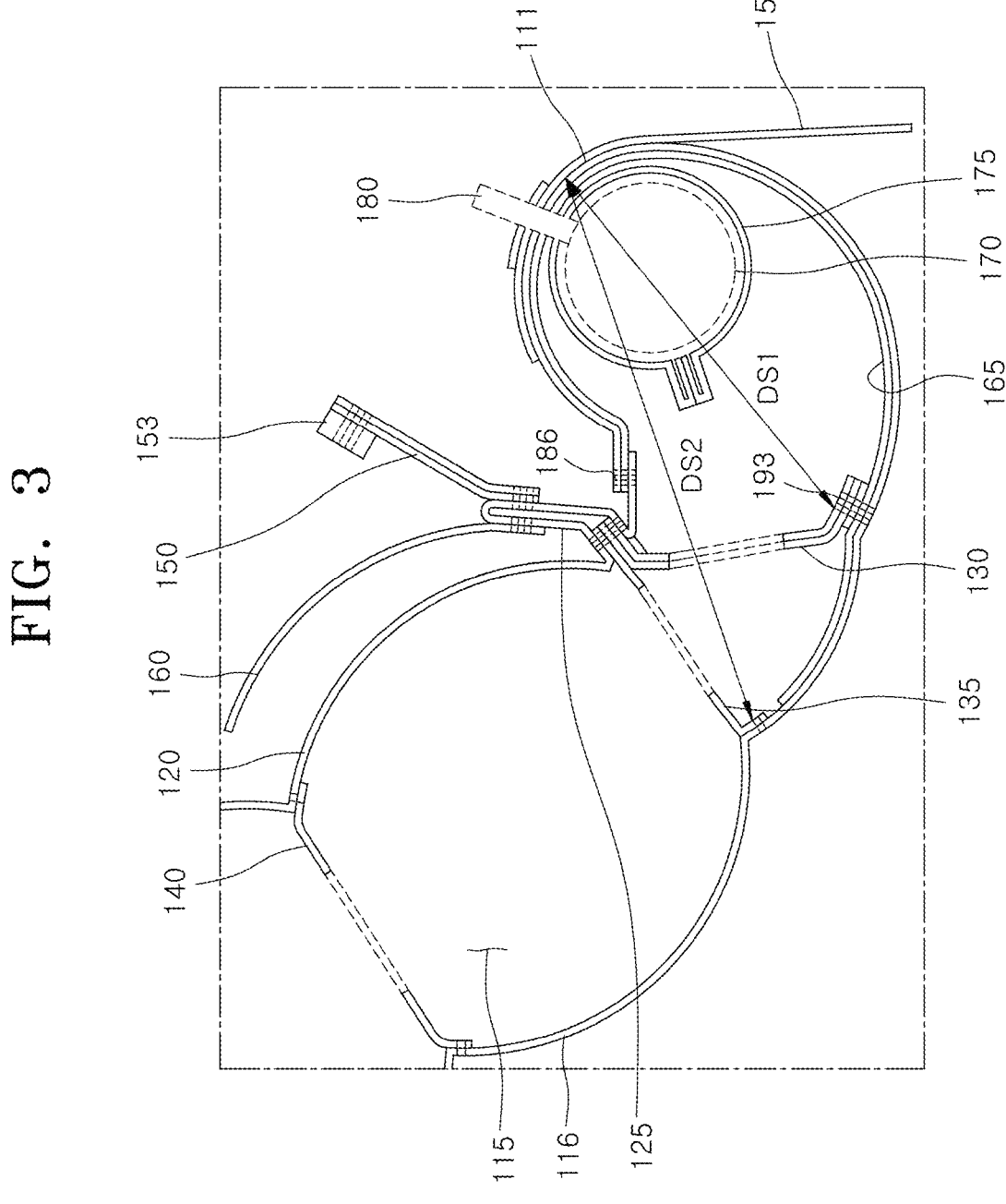
FIG. 3 is an enlarged view of part III in FIG. 2.
Figure 4:
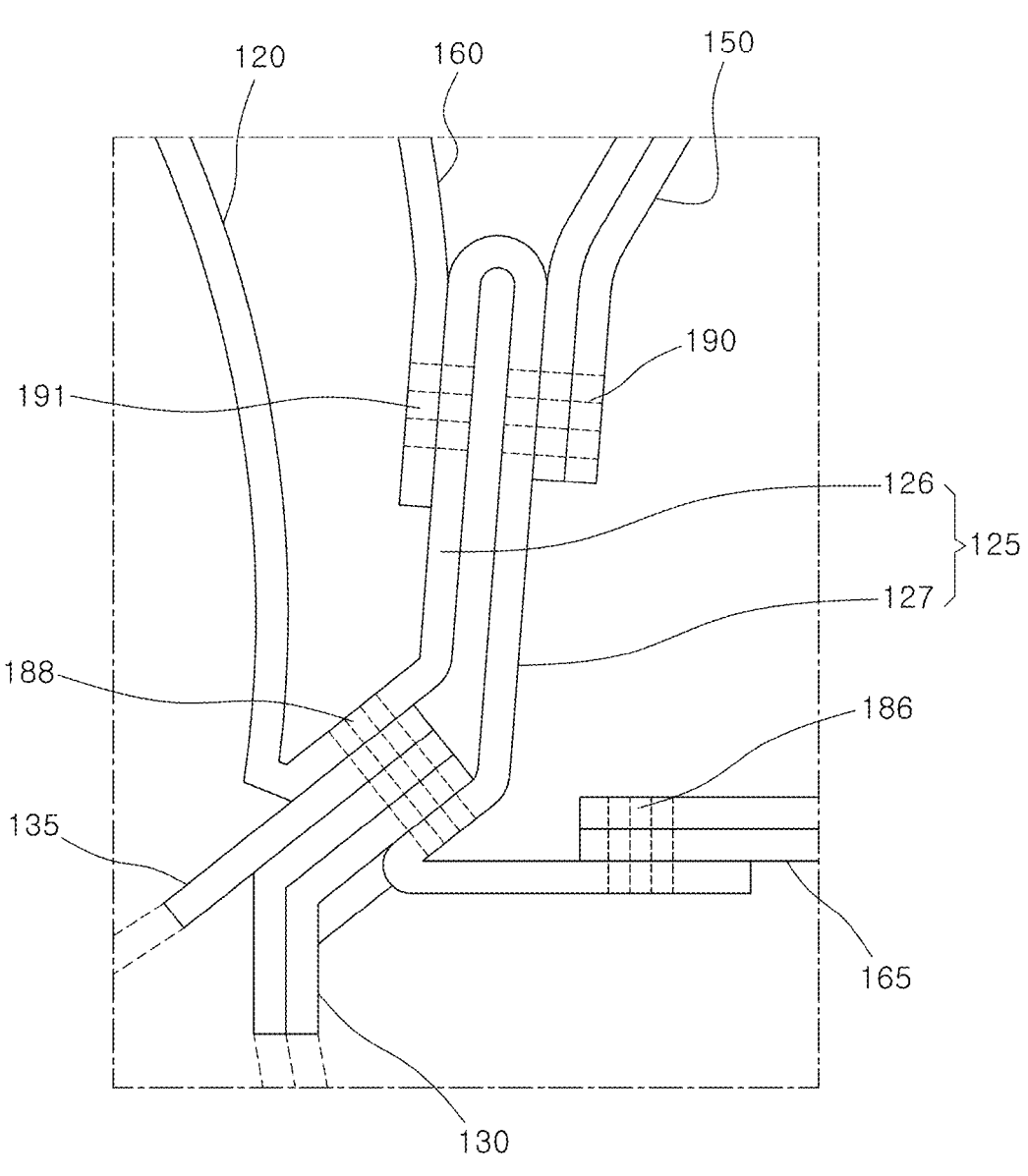
FIG. 4 is an enlarged view of part IV in FIG. 3.
Figure 5:
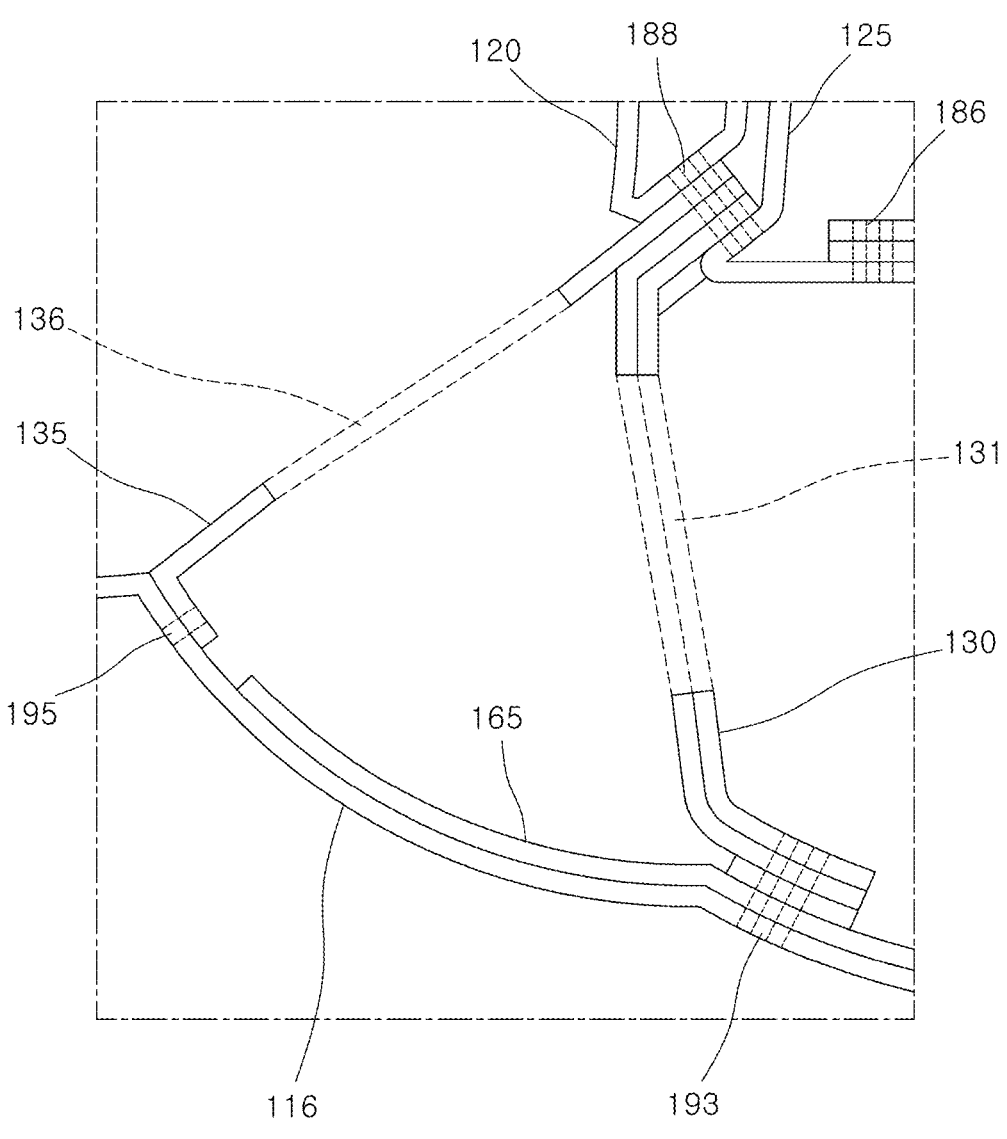
FIG. 5 is an enlarged view of part V in FIG. 3.
Figure 6:
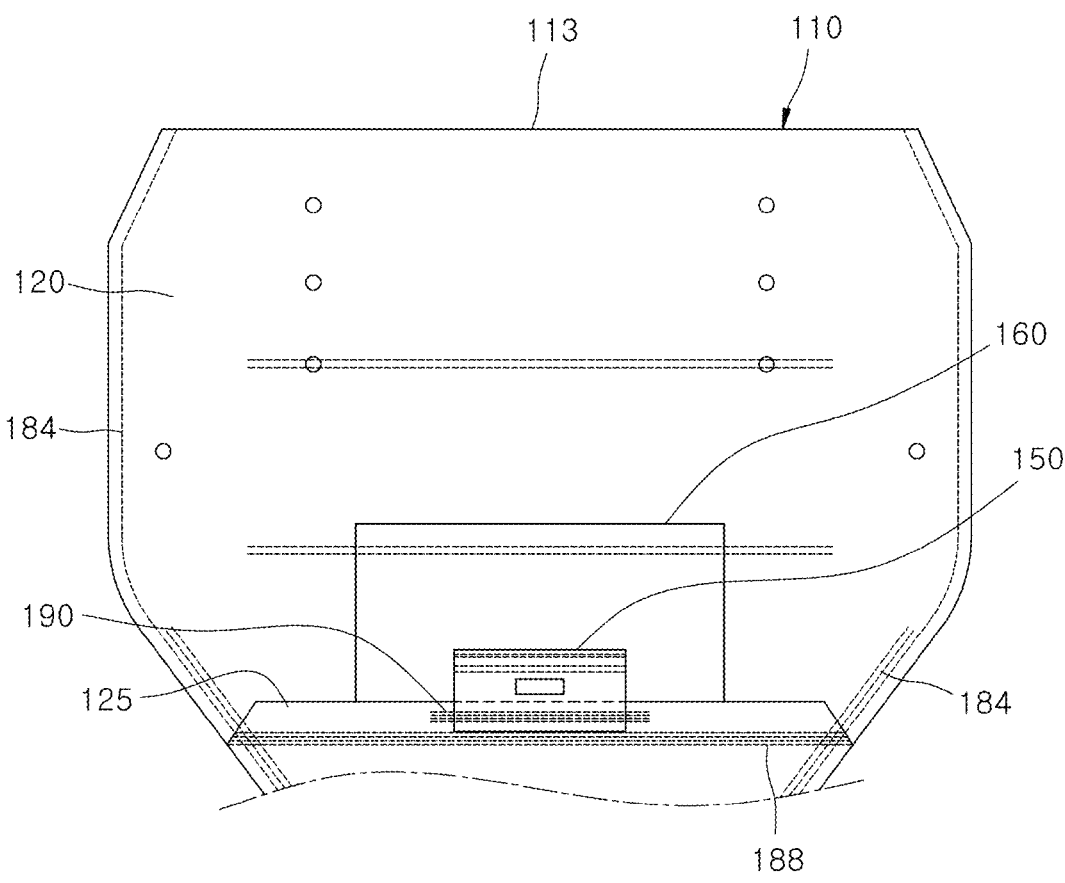
FIG. 6 is a top plan view of an airbag cushion in FIG. 2.
Figure 6:
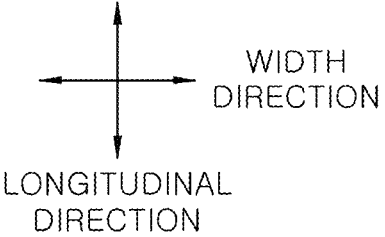
Figure 7:
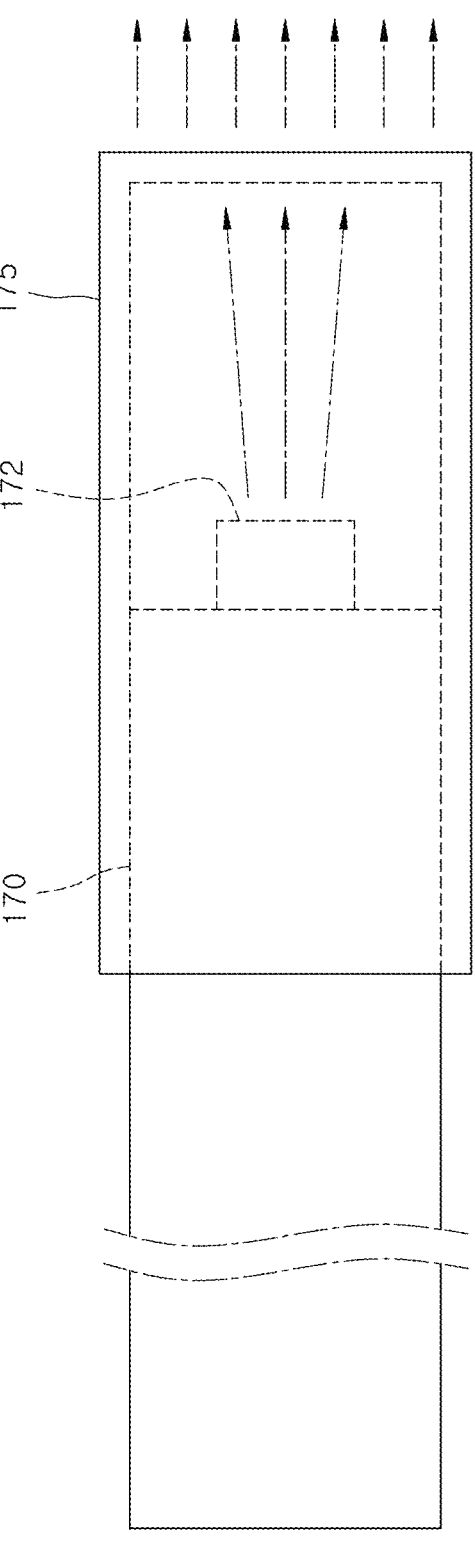
FIG. 7 is a top plan view illustrating an inflator and a diffuser in FIG. 3 when viewed from above.

FIG. 1 is a cross-sectional view illustrating a state in which a knee airbag apparatus according to an embodiment of the present disclosure is accommodated in an airbag housing, FIG. 2 is a cross-sectional view illustrating a state in which the knee airbag apparatus according to the embodiment of the present disclosure is deployed, i.e., a view illustrating a state in which an instrument panel and an airbag housing are removed, FIG. 3 is an enlarged view of part III in FIG. 2, FIG. 4 is an enlarged view of part IV in FIG. 3, FIG. 5 is an enlarged view of part V in FIG. 3, FIG. 6 is a top plan view of an airbag cushion in FIG. 2, and FIG. 7 is a top plan view illustrating an inflator and a diffuser in FIG. 3 when viewed from above.

With reference to FIGS. 1 to 7, a knee airbag apparatus 100 according to an embodiment of the present disclosure includes an airbag cushion 110 and an inflator 170. The knee airbag apparatus 100 may be installed in an instrument panel 5 of a vehicle and installed at a height equal to or slightly lower than a height of a knee of an occupant seated in a seat of the vehicle.

The airbag cushion 110 includes a lower sheet portion 116, an upper sheet portion 120, and a folded portion 125. The upper sheet portion 120 overlaps the lower sheet portion 116 to define a cushion space 115 together with the lower sheet portion 116. The upper sheet portion 120 may overlap an upper side of the lower sheet portion 116. The folded portion 125 is formed by folding the upper sheet portion 120 so that the upper sheet portion 120 partially overlap and coupling the upper sheet portion 120 so as not to be unfolded.

The airbag cushion 110 may be formed by folding one panel, which is made by cutting a raw fabric, such as a woven fabric and a non-woven fabric, into a predetermined planar shape, so that the lower sheet portion 116, the upper sheet portion 120, and the folded portion 125 are distinguished and sewing the panel. More specifically, a widthwise end of the lower sheet portion 116 and a widthwise end of the upper sheet portion 120, which face each other, may be coupled to each other by means of an outer peripheral sewed portion 184 using a thread.

A part of the panel is folded so that a pair of folded piece portions 126 and 127, which face each other, are formed. The pair of folded piece portions 126 and 127 may be coupled by a sewed portion 188 by using a thread. A length of the upper sheet portion 120 is shorter than a length of the lower sheet portion 116 by the folded portion 125, such that an upward deployment force of the airbag cushion 110 may be improved.

The airbag cushion 110 includes a first end 111 and a second end 113 in a longitudinal direction. An end of the lower sheet portion 116, which is farthest from the second end 113, may be coupled to an end of the upper sheet portion 120 by a sewed portion 186 using a thread. The sewed portion 186 may be positioned to be close to the first end 111. The second end 113 may be formed, without a sewed portion, by the panel folded so that the lower sheet portion 116 and the upper sheet portion 120 are distinguished.

The inflator 170 supplies a gas into the cushion space 115 so that the airbag cushion 110 is deployed. When a collision of the vehicle is detected, an airbag control unit (ACU) of the vehicle generates a signal for operating the inflator and transmits the signal to the inflator 170. Therefore, the gas is explosively discharged from a gas discharge port 172 of the inflator 170, and the gas is rapidly supplied to the cushion space 115, such that the airbag cushion 110 may be deployed from a folded state illustrated in FIG. 1 to an expanded state illustrated in FIG. 2.

In FIG. 1, the folded shape of the airbag cushion 110 is just an example. The airbag cushion of the present disclosure may be folded in various shapes different from the shape in FIG. 1 depending on the method of folding the airbag cushion 110.

The inflator 170 may be positioned in the cushion space 115 and be closer to the first end 111 than the second end 113 of the airbag cushion 110. The folded portion 125 may be positioned to be closer to the first end 111 than the second end 113 of the airbag cushion 110. The inflator 170 may be positioned to be closer to the first end 111 than the folded portion 125.

The knee airbag apparatus 100 may further include a diffuser 175 and a heat-resistant layer 165. The diffuser 175 surrounds the inflator 170 and diffuses the gas discharged from the gas discharge port 172 of the inflator 170. The gas discharged from the gas discharge port 172 may have a very high temperature and be concentratedly discharged with a narrow width. Therefore, the diffuser 175 appropriately reduces discharge pressure by adjusting a discharge path of the gas, which is discharged from the gas discharge port 172, and diffusing a discharge width, such that the gas may be uniformly and efficiently supplied in the cushion space 115. In addition, it is possible to prevent the high-temperature, high-pressure gas from being discharged directly to an inner surface of the airbag cushion 110 and thus prevent damage to the airbag cushion 110.

The heat-resistant layer 165 may be stacked on an inner surface of the first end 111 of the airbag cushion 110. The heat-resistant layer 165 may prevent damage to the airbag cushion 110 caused by the high-temperature, high-pressure gas discharged from the inflator 170. The heat-resistant layer 165 may include a material having excellent flame-retardant and heat-resistant properties.

The knee airbag apparatus 100 may further include mouth tethers 130 and 135 and center tethers 140 and 145. The mouth tethers 130 and 135 may be positioned in the cushion space 115 and be closer to the first end 111 than the second end 113 of the airbag cushion 110. The mouth tethers 130 and 135 may each include a first end coupled to the folded portion 125, and a second end coupled to the lower sheet portion 116.

The mouth tethers 130 and 135 includes a first mouth tether 130 and a second mouth tether 135. The first end of the first mouth tether 130 and the first end of the second mouth tether 135 may be fitted into the folded portion 125 and sewed and coupled together with the folded portion 125 by the sewed portion 188 using the thread.

More specifically, the first end of the first mouth tether 130 and the first end of the second mouth tether 135 are fitted into a gap between the pair of folded piece portions 126 and 127 constituting the folded portion 125 and then the sewed portion 188 is formed by using the thread, such that the first end of the first mouth tether 130 and the first end of the second mouth tether 135 may be coupled to the folded portion 125 at the same time when the folded portion 125 is coupled.

The second end of the first mouth tether 130 may be coupled to the lower sheet portion 116 by a sewed portion 193 using a thread, and the second end of the second mouth tether 135 may be coupled to the lower sheet portion 116 by a sewed portion 195 using a thread.

The second end of the second mouth tether 135 is coupled to the lower sheet portion 116 at a position different from a position at which the second end of the first mouth tether 130 is coupled to the lower sheet portion 116. The second end of the first mouth tether 130 may be positioned to be closer to the first end 111 of the airbag cushion 110 than the second end of the second mouth tether 135. In other words, when the airbag cushion 110 is deployed, a distance DS1 from the first end 111 of the airbag cushion 110 to the second end of the first mouth tether 130 may be shorter than a distance DS2 from the first end 111 of the airbag cushion 110 to the second end of the second mouth tether 135.

A length from the first end to the second end of the second mouth tether 135 may be shorter than a length from the first end to the second end of the first mouth tether 130. The second end of the second mouth tether 135, which has the length shorter than the length of the first mouth tether 130, pulls the lower sheet portion 116 upward, such that the upward deployment force of the airbag cushion 110 may be further improved.

Because the first mouth tether 130 is positioned to be closer to the inflator 170 than the second mouth tether 135, a thickness of the first mouth tether 130 may be larger than a thickness of the second mouth tether 135 to suppress damage caused by the high-temperature, high-pressure gas discharged from the inflator 170. For example, as illustrated in FIG. 5, the first mouth tether 130 may include two sheets overlapping each other, and the second mouth tether 135 may include one sheet.

Through-holes 131 and 136 may be formed in intermediate portions between the first and second ends the first and second mouth tethers 130 and 135 so that the gas discharged from the inflator 170 may quickly flow from the cushion space 115 toward the first end of the airbag cushion 110.

The center tethers 140 and 145 may be positioned in the cushion space 115 and positioned between the second end 113 of the airbag cushion 110 and the mouth tethers 130 and 135. The center tethers 140 and 145 allow the deployed shape of the airbag cushion 110 to be a flat pad-like shape without swelling like a water droplet.

The center tethers 140 and 145 may each have a first end coupled to the upper sheet portion 120, and a second end coupled to the lower sheet portion 116. The center tethers 140 and 145 may include a first center tether 140, and a second center tether 145 positioned to be closer to the second end 113 of the airbag cushion 110 than the first center tether 140.

The first ends of the first and second center tethers 140 and 145 may be sewed and coupled to the upper sheet portion 120 by using the thread. The second ends of the first and second center tethers 140 and 145 may be sewed and coupled to the lower sheet portion 116 by using the thread.

Through-holes may be formed in intermediate portions between the first and second ends of the pair of center tethers 140 and 145 so that the gas discharged from the inflator 170 may quickly flow from the cushion space 115 toward the first end of the airbag cushion 110. Alternatively, the pair of center tethers 140 and 145 are disposed only at a central portion of the airbag cushion 110 based on the width direction, and the pair of center tethers 140 and 145 may not be disposed at two opposite ends.

The knee airbag apparatus 100 may further include an airbag housing 101, an inflator coupler 180, a hook tether 150, a cushion cover 155, and a cushion flap 160. The airbag housing 101 may include a base 103 and a cover 107. An internal space 109, in which the airbag cushion 110 is accommodated in a folded state, is formed in the base 103. The base 103 may be installed in the instrument panel 5.

An opening is provided in the base 103 so that the airbag cushion 110 is deployed while protruding to the outside of the instrument panel 5. The cover 107 may be coupled to the base 103 to close the opening of the base 103. When the folded airbag cushion 110 is deployed while being unfolded, the cover 107 may separate and depart from the base 103 by the deployment force of the airbag cushion 110, such that the opening of the base 103 may be opened.

One side of the inflator coupler 180 may be coupled to the base 103 so that the inflator 170 is supported on the base 103, and the other side of the inflator coupler 180 may be coupled to the inflator 170. The hook tether 150 includes a first end coupled to the folded portion 125, and a second end configured to penetrate the airbag housing 101 and connected to the airbag housing 101. The first end of the hook tether 150 may be coupled to the folded portion 125 by a sewed portion 190 using a thread. A hook tether through-hole, which is penetrated by the hook tether 150, may be formed in the base 103.

The second end of the hook tether 150 includes a hook 153 that cannot pass through the hook tether through-hole. The hook 153 may be coupled to an outer surface of the base 103 by a fastener or kept decoupled from the outer surface of the base 103. When the airbag cushion 110 is deployed, the folded portion 125 between the first end 111 and the second end 113 of the airbag cushion 110 is supported on the base 103 by the hook tether 150, which may prevent a situation in which the airbag cushion 110 rotates about the first end 111 and the second end 113 falls downward.

The cushion cover 155 blocks the deployment of the airbag cushion 110 so that the airbag cushion 110 is kept folded when the gas is not supplied to the cushion space 115 by the inflator 170. The cushion cover 155 may include a first end coupled to the outer surface of the airbag cushion 110, and a second end coupled to the airbag housing 101. When the airbag cushion 110 is deployed, the cushion cover 155 may be disconnected, or the second end of the cushion cover 155 may be separated from the airbag housing 101.

More specifically, the first end of the cushion cover 155 may be coupled to the outer surface of the first end 111 of the airbag cushion 110, and the second end of the cushion cover 155 may be attached to an outer or inner surface of the base 103 around the opening of the base 103. A tear line may be provided between the first end and the second end of the cushion cover 155.

The airbag cushion 110 may be deployed as the cushion cover 155 is disconnected along the tear line by the deployment force of the airbag cushion 110. In case that the cushion cover 155 has no tear line, the airbag cushion 110 may be deployed as the second end of the cushion cover 155 separates and departs from the base 103 by the deployment force of the airbag cushion 110.

The cushion flap 160 may include a first end coupled to the folded portion 125, and a second end that is a free end. The first end of the cushion flap 160 may be coupled to the folded portion 125 by a sewed portion 191 using a thread.

The cushion flap 160 may be deployed so that the airbag cushion 110 does not enter a gap between the base 103 of the airbag housing 101 and the instrument panel 5 or is not caught by the instrument panel 5 when the airbag cushion 110 is deployed. More specifically, when the airbag cushion 110 is deployed, the second end of the cushion flap 160 may be deployed between the outer surface of the instrument panel 5 and the upper sheet portion 120.

While the present disclosure has been described with reference to the exemplary embodiment depicted in the drawings, the exemplary embodiment is described just for illustration, and those skilled in the art to the present technology pertains will understand that various modifications of the exemplary embodiment and any other exemplary embodiment equivalent thereto are available. Accordingly, the true protection scope of the present disclosure should be determined by the appended claims.

What is claimed is:

1. A knee airbag apparatus comprising:
an airbag cushion comprising a lower sheet portion, an upper sheet portion configured to overlap the lower sheet portion to form a cushion space together with the lower sheet portion, and a folded portion formed by folding the upper sheet portion so that portions of the upper sheet portion overlap partially;
an inflator configured to supply a gas to the cushion space so that the airbag cushion is deployed; and
a mouth tether positioned in the cushion space closer to a first end than a second end of the airbag cushion and comprising a first end coupled to the folded portion, and a second end coupled to the lower sheet portion,
wherein the mouth tether comprises:
a first mouth tether; and
a second mouth tether comprising a first end coupled to the folded portion together with a first end of the first mouth tether, and a second end coupled to the lower sheet portion at a position different from a position at which a second end of the first mouth tether is coupled to the lower sheet portion,
wherein the folded portion comprises a pair of folded piece portions defining a gap therebetween, wherein the first end of the first mouth tether and the first end of the second mouth tether are fitted into the gap and sewn to the folded portion by a sewed portion,
wherein the second end of the first mouth tether is positioned closer to the first end of the airbag cushion than the second end of the second mouth tether, and
wherein a length from the first end to the second end of the second mouth tether is shorter than a length from the first end to the second end of the first mouth tether.

2. The knee airbag apparatus of claim 1, wherein the second end of the airbag cushion is opposite to the first end of the airbag cushion in a longitudinal direction, the inflator is positioned in the cushion space closer to the first end than the second end of the airbag cushion, and the folded portion is positioned closer to the first end than the second end of the airbag cushion.

3. The knee airbag apparatus of claim 2, further comprising:
a heat-resistant layer stacked on an inner surface of the first end of the airbag cushion.

4. The knee airbag apparatus of claim 2, wherein an end of the lower sheet portion that is coupled to an end of the upper sheet portion by a sewed portion is an end of the lower sheet that is farthest from the second end of the airbag cushion.

5. The knee airbag apparatus of claim 1, wherein a thickness of the first mouth tether is larger than a thickness of the second mouth tether.

6. The knee airbag apparatus of claim 1, further comprising:
a center tether positioned between the second end of the airbag cushion and the mouth tether in the cushion space and having a first end coupled to the upper sheet portion, and a second end coupled to the lower sheet portion.

7. The knee airbag apparatus of claim 1, further comprising:
an airbag housing defining an internal space in which the airbag cushion is accommodated in a folded state; and
a hook tether comprising a first end coupled to the folded portion, and a second end configured to penetrate the airbag housing and connected to the airbag housing.

8. The knee airbag apparatus of claim 7, wherein the airbag housing comprises:
a base connected to the hook tether; and
a cover coupled to the base and configured to separate from the base when the airbag cushion is deployed.

9. The knee airbag apparatus of claim 1, further comprising:
a cushion cover configured to block the deployment of the airbag cushion so that the airbag cushion is kept folded when gas is not supplied to the cushion space by the inflator.

10. The knee airbag apparatus of claim 9, further comprising:
an airbag housing defining an internal space in which the airbag cushion is accommodated in a folded state,
wherein the cushion cover comprises a first end coupled to an outer surface of the airbag cushion, and a second end coupled to the airbag housing, and
wherein the cushion cover is disconnected or the second end of the cushion cover is separated from the airbag housing when the airbag cushion is deployed.

11. The knee airbag apparatus of claim 1, further comprising:
a cushion flap comprising a first end coupled to the folded portion, and a second end that is a free end.

12. The knee airbag apparatus of claim 1, further comprising:

a diffuser configured to surround the inflator and diffuse a gas discharged from a gas discharge port of the inflator.

* * * * *